(12) United States Patent
List et al.

(10) Patent No.: US 11,428,317 B2
(45) Date of Patent: Aug. 30, 2022

(54) PARKING LOCK ARRANGEMENT

(71) Applicant: ZF Friedrichshafen AG, Friedrichshafen (DE)

(72) Inventors: Matthias List, Friedrichshafen (DE); Bernd Austermann, Meckenbeuren (DE); Juergen Igelmaier, Frickingen (DE); Tobias Miller, Waldburg (DE); Armin Gierling, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/874,718

(22) Filed: May 15, 2020

(65) Prior Publication Data
US 2020/0362965 A1 Nov. 19, 2020

(30) Foreign Application Priority Data
May 17, 2019 (DE) ...................... 10 2019 207 214.3

(51) Int. Cl.
*F16H 63/34* (2006.01)
(52) U.S. Cl.
CPC ............... *F16H 63/3425* (2013.01)
(58) Field of Classification Search
CPC ............. F16H 63/3425; F16H 63/3433; F16H 63/3416; B60T 1/005
See application file for complete search history.

(56) References Cited

U.S. PATENT DOCUMENTS

| | | | | |
|---|---|---|---|---|
| 3,373,850 A | * | 3/1968 | Helmer | ................... B60T 1/005 192/219.5 |
| 4,722,427 A | | 2/1988 | Prumbaum et al. | |
| 6,588,294 B1 | * | 7/2003 | Rogg | .................. F16H 63/3416 74/473.21 |
| 8,985,295 B2 | | 3/2015 | Reichert et al. | |
| 2008/0236988 A1 | * | 10/2008 | Kasuya | ................... B60T 1/062 192/219.5 |

FOREIGN PATENT DOCUMENTS

| | | |
|---|---|---|
| DE | 3537091 C1 | 4/1987 |
| DE | 102011075294 A1 | 11/2012 |
| DE | 102015210287 | * 12/2016 |

OTHER PUBLICATIONS

Machine language Translation of DE102015210287.*

* cited by examiner

*Primary Examiner* — Stacey A Fluhart
(74) *Attorney, Agent, or Firm* — Dority & Manning, P.A.

(57) ABSTRACT

A parking lock arrangement with an actuating device for engaging and disengaging a parking pawl (10) for interlocking and releasing a parking interlock gear (20) includes an axially movable actuating rod (30) with an axially displaceable actuating element (40) on an end facing the parking pawl (10). During the engagement and disengagement of the parking lock, an actuating contour (41) of the actuating element (40) is in contact with an actuating zone (13) of the parking pawl (10) and with a support contour (51) of a housing-affixed guide element (50). The actuating contour (41) is designed to be rotationally symmetrical with respect to a longitudinal axis (42) of the actuating element (40) and extends along this longitudinal axis (42). The actuating contour (41) is a circular arc as viewed in the direction of the longitudinal axis (42) of the actuating element (40).

18 Claims, 5 Drawing Sheets

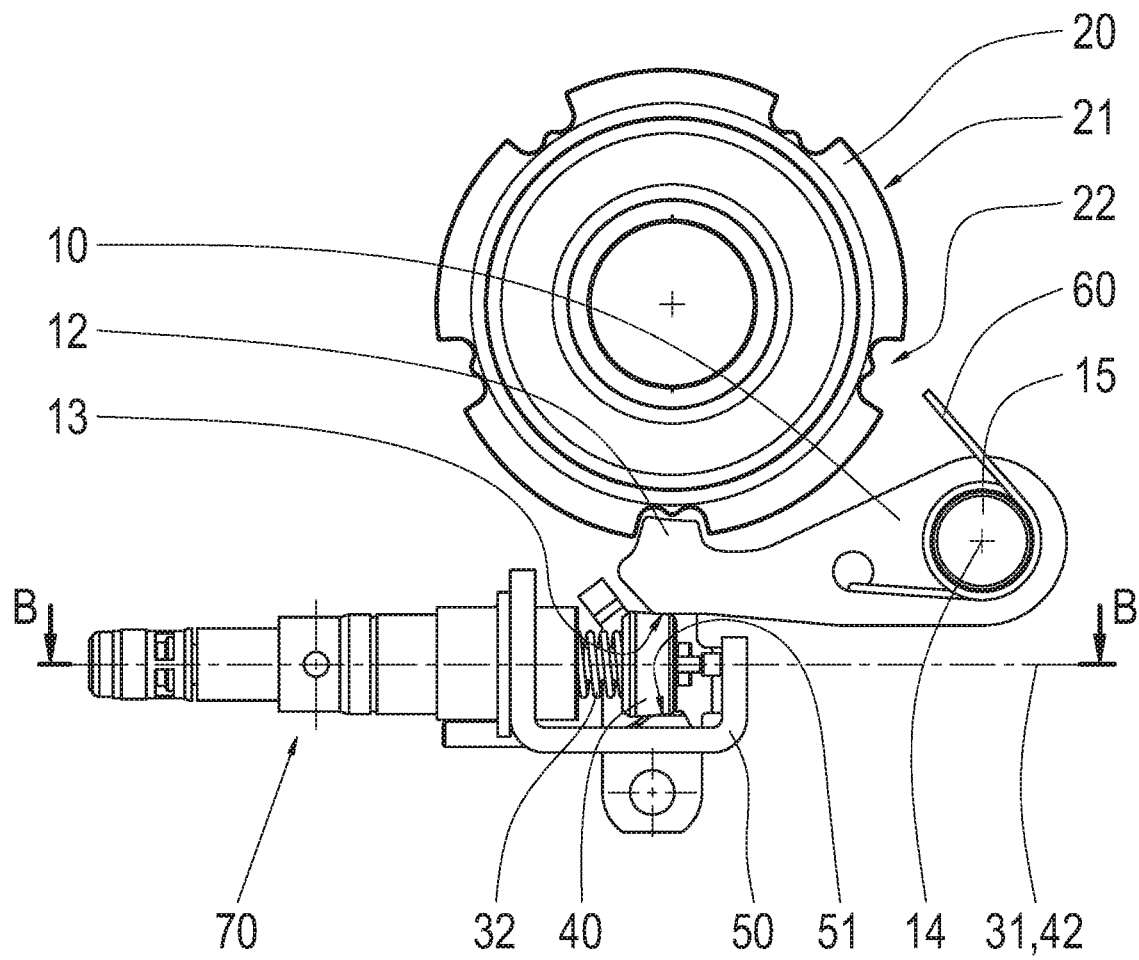
(Prior Art) Fig. 1
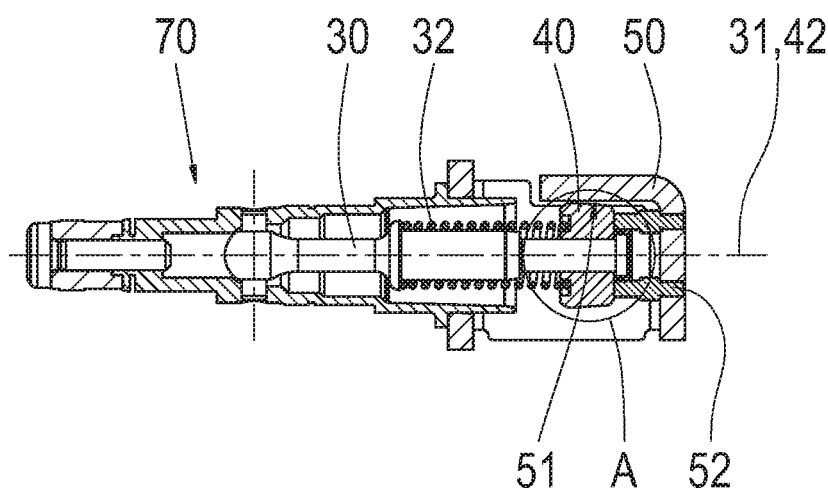
(Prior Art) Fig. 2

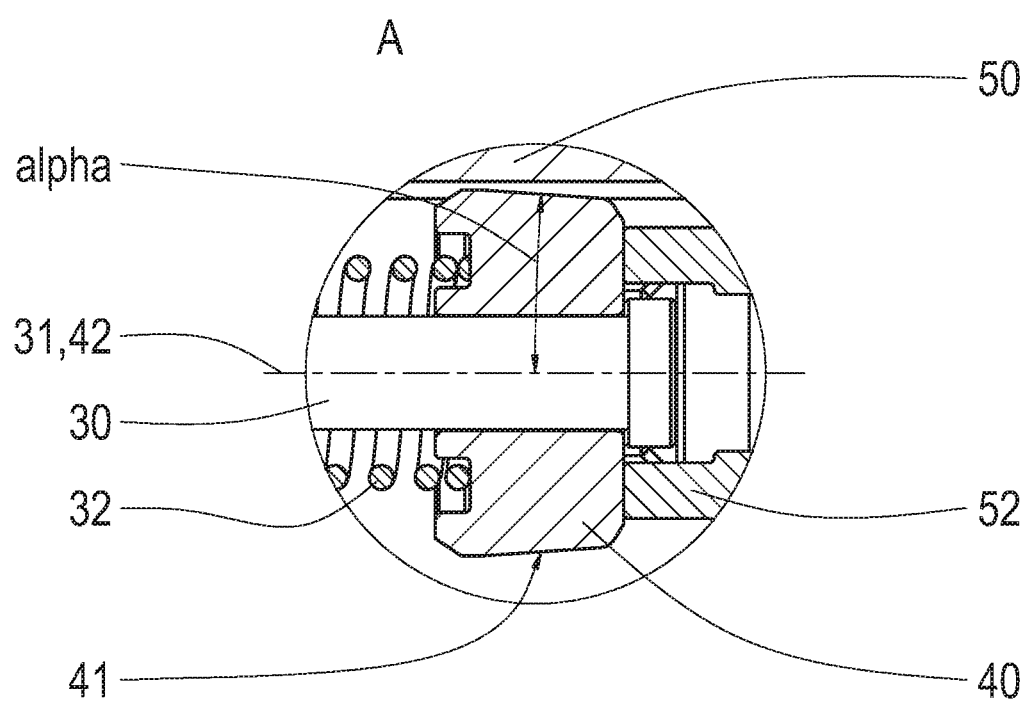
(Prior Art) Fig. 3

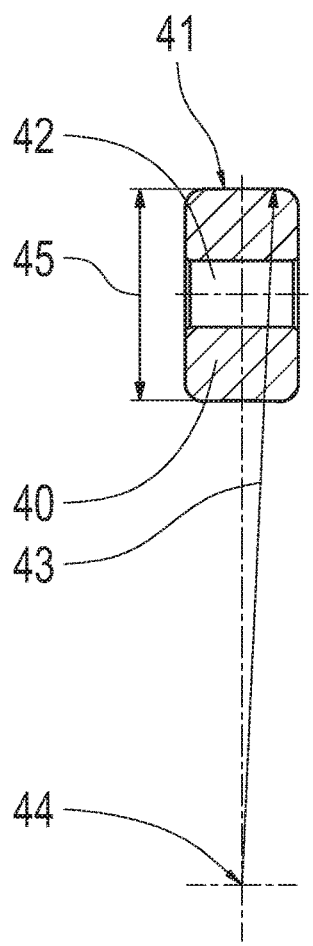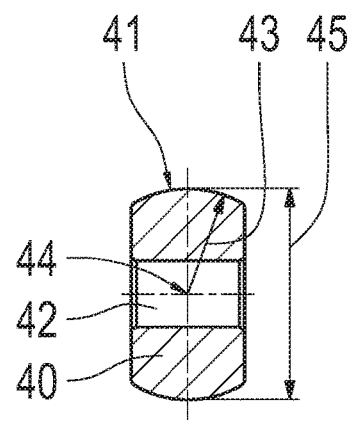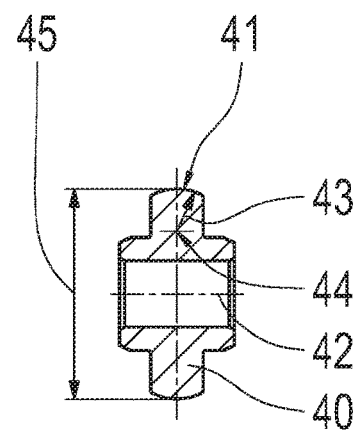
Fig. 7
Fig. 8
Fig. 9

PARKING LOCK ARRANGEMENT

CROSS-REFERENCE TO RELATED APPLICATION

The present application is related and has right of priority to German Patent Application No. 10 2019 207 214.3 filed on May 17, 2019, which is incorporated by reference in its entirety for all purposes.

FIELD OF THE INVENTION

The present invention relates generally to a parking lock arrangement including an actuating device for engaging and disengaging a parking pawl for interlocking and releasing a parking interlock gear.

BACKGROUND

Parking lock arrangements for actuating a parking pawl for interlocking and releasing a parking interlock gear in an automatic transmission are widely known from the prior art. Usually, in the engaged or interlocked condition of the parking lock, a ratchet tooth of the parking pawl engages, in a form-locking manner, into a corresponding tooth space of a locking toothing of the parking interlock gear. In order to actuate the parking lock, an actuating element is usually provided. The actuating element is mounted—in such a way as to be displaceable against a preloading ring in the axial direction—on an actuating rod. The actuating rod is movable in a direction suitable for engaging and disengaging the parking lock, and includes a contact area, which acts on a corresponding actuating edge of the parking pawl. For example, parking locks are known, in which the actuating element applies an axial force onto the contact area of the parking pawl in order to engage the parking pawl and, for the case in which the ratchet tooth of the parking pawl has engaged into a tooth space of the locking toothing of the parking interlock gear, the parking pawl locks in the "parking lock engaged" engagement condition, so that an actuating element must be pulled in order to disengage the parking lock from this interlocked position. In order to be able to implement this function, the actuating element includes, on a side of the actuating element diametrically opposed to the actuating edge of the parking pawl, a support contour, which rests against a housing-affixed support element suitable for this purpose.

Such a parking lock arrangement is known, for example, from publication DE 35 37 091 C1. In this case, the actuating element is designed as an interlocking cone, which, during the disengagement of the parking lock, moves axially parallel to the swivel axis of the parking pawl along a slanted mating face of the parking pawl. The interlocking cone has a linear taper angle, wherein, as viewed in the axial direction, a cylindrical section of the actuating element in each case adjoins the smallest as well as the largest cone outer diameter. If the parking lock is brought from the "parking lock disengaged" engagement condition into the "parking lock engaged" engagement condition, the truncated cone of the interlocking cone is pressed axially against the slanted mating face of the parking pawl, so that the slanted mating face of the parking pawl slides along the truncated cone of the interlocking cone, starting from the smallest truncated cone outer diameter in the direction of and up to the largest truncated cone outer diameter and, in the process, the parking pawl executes a swiveling motion about the central axis of its housing bearing.

As an alternative embodiment for the actuating element of the parking lock arrangement, publication DE 10 2011 075 294 A1, for example, provides a roller system includes two cylindrical rollers, which are arranged axially in parallel to one another and are rotatably mounted in a cage, which is axially displaceably mounted on an actuating rod against a preloading spring. The central axis of the actuating rod extends perpendicularly to the central axes of the two rollers. During the actuation of the parking pawl, one of the two rollers rolls on a contact surface of the parking pawl, which is designed to be slanted for this purpose, whereas the other of the two rollers rolls on a support surface of a housing-affixed support element diametrically opposed to the contact surface of the parking pawl.

It is known that the contact angle, active during the actuation of the parking pawl, between the parking pawl and the actuating element, i.e., the taper angle of the interlocking cone in the case of the interlocking cone, substantially affects the self-locking at the actuating device of the parking lock, which is desired in practical applications. As is known, self-locking always takes place at the actuating element for the case in which the sum of the existing friction forces is greater than the sum of the forces that result in the axial displacement of the actuating element.

SUMMARY OF THE INVENTION

Example aspects of the present invention provide a parking lock arrangement of the type described at the outset, which is improved with regard to installation space and mass.

Example aspects of the invention provide a parking lock arrangement including an actuating device for engaging and disengaging a parking pawl, swivelably mounted on a pin, for interlocking or releasing a parking interlock gear, in particular, in an automatic transmission of a motor vehicle. The actuating device includes an at least axially movable actuating rod with an actuating element, which is provided at the end facing the parking pawl and has an actuating contour. The actuating contour extends along a longitudinal axis of the actuating element and, during the engagement and disengagement of the parking lock, is in contact with an actuating zone of the parking pawl as well as with a support contour of a housing-affixed guide element. The actuating element is axially displaceably mounted on the actuating rod.

Example aspects of the invention take into account the finding that, in such a parking lock arrangement, both during the engagement of the ratchet tooth of the parking pawl into a tooth space of the locking toothing of the parking interlock gear as well as during the disengagement of the ratchet tooth of the parking pawl from the tooth space of the locking toothing of the parking interlock gear, highly dynamic and high-frequency loads can occur, which cause micro-movements to arise, which unfavorably affect the tribology in this contact area; the micro-movements arise due to the mandatory clearance fits between the components, movable with respect to one another, of the parking lock arrangement in the contact area of the actuating element and the parking pawl, i.e., at the point where the actuating contour of the actuating element and the actuating edge of the parking pawl meet.

This, in particular in combination with a comparatively low geometric overlap of the actuating element and the parking pawl in this contact area, can result in a loss of the intended self-locking at the actuating element. Although a small—relative to the longitudinal axis—and flat interlocking angle at the actuating element is helpful in order to counteract a loss of the intended self-locking due to micromovements, a small taper angle also causes undesirably high release forces. Self-locking always takes place at the actuating element for the case in which the sum of the existing friction forces is greater than the sum of the forces that result in the axial displacement of the actuating element. The forces bringing about the axial displacement of the actuating element result, as is known, from the actually existing contact forces between the actuating element and the housing-affixed guide element, against which the actuating element rests during the engagement and disengagement of the parking lock, the actually existing contact forces between the actuating element and the contact zone of the parking pawl, on which the actuating element acts during the engagement and disengagement of the parking lock, and the actually operative spring force of the preloading spring, which preloads the actuating element, which is axially displaceably mounted on the actuating rod.

In any case, the axial length of the actuating contour—operative during the actuation of the parking lock—on the actuating element must be great enough that, under consideration of the actually possible tolerances of all components involved and the actually possible wear of all components involved, the self-locking at the actuating element is not lost at the contact areas of the actuating element with the parking pawl and the housing-affixed support element in the entire actually possible operating temperature range. A long axial length of the actuating element acts unfavorably, however, on the necessary installation space and on the mass of the actuating element. The greater the mass of the actuating element is, the greater, necessarily, are also the actuation forces necessary in the parking lock system. High actuation forces must be supported using a more complex structure. A large mass of the actuating element and high spring forces in the parking lock system also negatively affect a housing-affixed stop—with respect to the load thereon—which may be provided for the actuating element.

In order to effectively reduce the necessary installation space and the mass of the actuating element, it is provided with respect to the actuating device, according to example aspects of the invention, of the parking lock arrangement, that the actuating contour of the actuating element—which is in contact with the actuating zone of the parking pawl as well as with the support contour of the housing-affixed guide element during the engagement and disengagement of the parking lock—is designed to be rotationally symmetrical relative to its longitudinal axis and extends along this longitudinal axis. According to example aspects of the invention, the actuating contour is designed as a circular arc as viewed in the direction of the longitudinal axis of the actuating element.

In one preferred geometric example embodiment of the actuating contour, the circular arc of the actuating contour is curved around a radius, the center of which is located on the longitudinal axis of the actuating element. The actuating contour can be designed to be spherical as viewed three-dimensionally.

In another advantageous geometric example embodiment of the actuating contour, the circular arc of the actuating contour is curved around a radius, the center of which is located outside the actuating element.

In one further advantageous geometric example embodiment of the actuating contour, the circular arc of the actuating contour is curved around a radius, the center of which is located in an area between the longitudinal axis of the actuating element and the actuating contour.

The geometry, according to example aspects of the invention, at the actuating element of the parking lock arrangement is comparatively easily implemented, in terms of fabrication, both with respect to the manufacture and also with respect to the testing for dimensional accuracy.

As compared to a parking lock arrangement including a locking cone as an actuating element—of the type known, for example, from DE 35 37 091 C1 cited at the outset—the design according to example aspects of the invention is characterized not only by the reduced mass and associated reduced spring and release forces, but rather also by a more robust behavior with respect to a loss of the self-locking at the actuating element, since, during the tilting of the actuating element, the operative angle of the force vectors in the contact area between the actuating element and the parking pawl, on the one hand, and in the contact area between the guide element and the actuating element, on the other hand, does not change.

As compared to a parking lock arrangement including a roller system as an actuating element—of the type known, for example, from DE 10 2011 075 294 A1 cited at the outset—the design according to example aspects of the invention is also characterized not only by the reduced mass and the associated reduced spring and release forces, but also by a reduced number of components, an overall more favorable production, a reduced tolerance sensitivity, and a greater security with respect to incorrect installation.

In order to not allow the release forces for the actuating element, according to example aspects of the invention, of the parking lock arrangement to become too great, it is advantageous to provide the geometry of the actuating zone of the parking pawl in contact with the actuating contour of the actuating element during the engagement and disengagement of the parking lock as well as the geometry of the support contour of the housing-affixed guide element in contact with the actuating contour of the actuating element during the engagement and disengagement of the parking lock with an interlocking angle of a constant or variable size, which forms an opening angle as viewed in the disengagement direction of the actuating element. The term "opening angle" is understood to mean an angle, which is enclosed by the longitudinal axis of the actuating element and by the extended line of the actuating zone of the parking pawl, which is slanted relative to the longitudinal axis of the actuating element, or which is enclosed by the longitudinal axis of the actuating element and by the extended line of the support contour of the housing-affixed guide element, which is slanted relative to the longitudinal axis of the actuating element.

Depending on the load histogram and depending on the manufacturing method, different contact geometries can be implemented at the actuating zone of the parking pawl as well as at the support contour of the housing-affixed guide element, and combined with one another, as illustrated by the following table. The term "osculation" is understood to mean a circular arc surface, which extends along the longitudinal axis of the actuating element as viewed in the longitudinal direction and has a radius about the longitudinal axis of the actuating element, which is approximate to the greatest outer diameter of the actuating contour of the actuating element.

| Variant | Actuating zone of the parking pawl | Support contour of the guide element |
| --- | --- | --- |
| V1 | osculation | osculation |
| V2 | straight line/planar surface | osculation |
| V3 | straight line/planar surface | straight line/planar surface |
| V4 | osculation | straight line/planar surface |

BRIEF DESCRIPTION OF THE DRAWINGS

Example aspects of the present invention are explained in greater detail in the following with reference to the drawings, wherein identical components and components having a comparable function are also provided with identical reference numbers. Wherein:

FIG. 1 shows a diagrammatic view of a parking lock arrangement according to the prior art;

FIG. 2 shows a diagrammatic sectional sectioning of the parking lock arrangement according to FIG. 1;

FIG. 3 shows a detailed section from FIG. 2, including an actuating element according to the prior art;

FIG. 7 shows a diagrammatic sectioning of a second exemplary embodiment of an actuating element according to example aspects of the invention;

FIG. 8 shows a diagrammatic sectioning of a third exemplary embodiment of an actuating element according to example aspects of the invention; and FIG. 9 shows a diagrammatic sectioning of a fourth exemplary embodiment of an actuating element according to example aspects of the invention.

DETAILED DESCRIPTION

Figure 5:
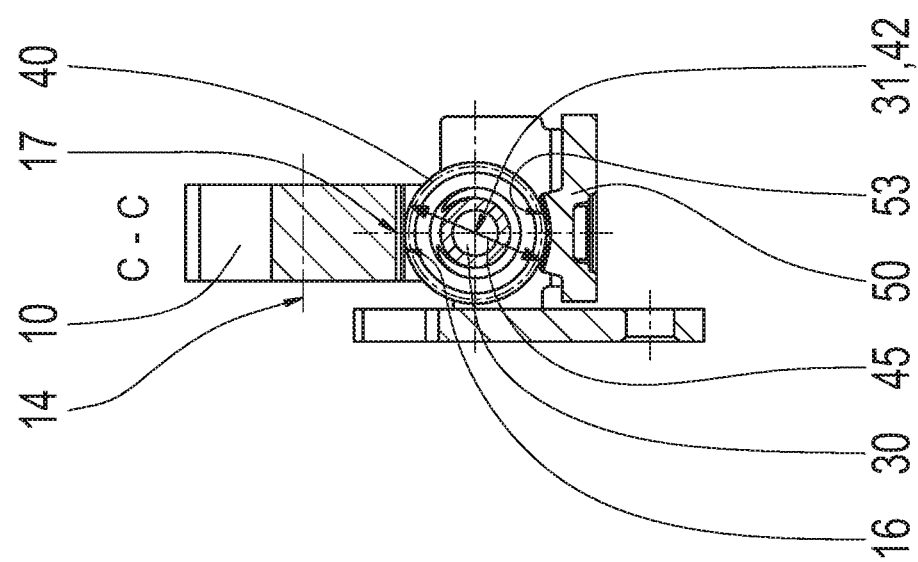
FIG. 5 shows a second diagrammatic sectional sectioning of the example parking lock arrangement according to FIG. 4.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 through 3 show various views and sections of an exemplary parking lock arrangement including an actuating device for engaging and disengaging a parking pawl 10 for interlocking and releasing a parking interlock gear 20 in a transmission (not represented in greater detail here) of a vehicle. In the interlocked or engaged condition of the parking lock, a ratchet tooth 12 of the parking pawl 10 swivelably mounted on a pin 15 engages, in a form-locking manner, into a tooth space 22 of a locking toothing 21 of the parking interlock gear 20. The swivel axis of the parking pawl 10 is labeled with 14.

The actuating device includes an at least axially movable actuating rod 30 including an actuating element 40, which is provided at the end facing the parking pawl 10 and, via an actuating contour 41, is in contact with an actuating zone 13 of the parking pawl 10 during the engagement and disengagement of the parking lock in order to interlock and release the same. In addition, the actuating element 40 is in contact, during the engagement and disengagement of the parking lock, with a support contour 51 of a housing-affixed guide element 50 for housing-affixed support. The longitudinal axis of the actuating rod 30 is labeled with 31. The longitudinal or central axis of the actuating element 40 is labeled with 42.

In the exemplary embodiment represented here, the actuating rod 30 is aligned approximately perpendicularly to the swivel axis 14 of the parking pawl 10, and so the parking lock arrangement represented here is very well suited for a front-transverse installation position of the transmission as well as for an electric drive of an input axle in a vehicle. In an alternative example embodiment, the actuating rod 30 can be aligned approximately in parallel to the swivel axis 14 of the parking pawl 10, so that the parking lock arrangement is very well suited for a longitudinal installation position of the transmission in a vehicle.

In the exemplary embodiment represented here, the basic shape of the actuating element 40 is a truncated cone, by way of example, so that the actuating contour 41 is formed by a section of the outer surface of the truncated cone, and the actuating zone 13 of the parking pawl 10 cooperating with the actuating contour 41 is an actuating edge.

In the exemplary embodiment represented here, the actuating rod 30 is designed as a piston of an electro-mechanical actuator 70, which is electrically actuated in order to disengage, and during the disengagement of, the parking lock and acts against the spring force of a holding spring 60. Alternatively, the actuation of the actuating rod 30 can also take place by a purely mechanical or hydraulic or electromagnetic actuator system. A further alternative is the reversal of the direction of action of the actuator, so that the parking lock is engaged by the operation or actuation of the actuator system and is disengaged by spring force.

A preloading spring 32 is provided on the side of the actuating element 40 facing away from the parking pawl 10 and concentrically surrounds the actuating rod 30, preloading the actuating element 40 for the case of a so-called tooth-on-tooth position between the parking pawl 10 and the parking interlock gear 20. The parking interlock gear 20 interlocking or releasing via the parking pawl 10 is coupled to an output shaft (not represented further here) of the vehicle, in order to lock the vehicle in a parked position when the parking lock is engaged and release the vehicle when the parking lock is disengaged.

In addition, in the exemplary embodiment represented here, a mechanical stop 52 is provided on the side of the actuating element 40 diametrically opposed to the preloading spring 32 and is formed by the front end of the actuating element 40 diametrically opposed to the preloading spring 32 and a stop surface of the housing-affixed guide element 50 corresponding to the front end of the actuating element 40, and delimits the maximum possible axial travel of the actuating element 40.

FIG. 3 shows an enlarged sectioning of an actuating element 40 designed, according to the prior art, as an interlocking cone, in the case of which the actuating contour 41 is formed by a planar bevel surface of the actuating element 40, which, relative to a longitudinal axis 42 of the actuating element 40, is slanted by a constant angle alpha in such a way that the radial distance of the actuating contour 41 to the longitudinal axis 42 of the actuating element 40 constantly increases in the axial course of the actuating contour 41 as viewed in the disengagement direction. In the exemplary embodiment represented in FIG. 3, the angle alpha is approximately four degrees (4*), by way of example.

In deviation therefrom, the actuating contour 41 of the actuating element 40 of a parking lock arrangement according to example aspects of the invention has another, in particular, geometric shape, which is explained in greater detail in the following.

Figure 4:
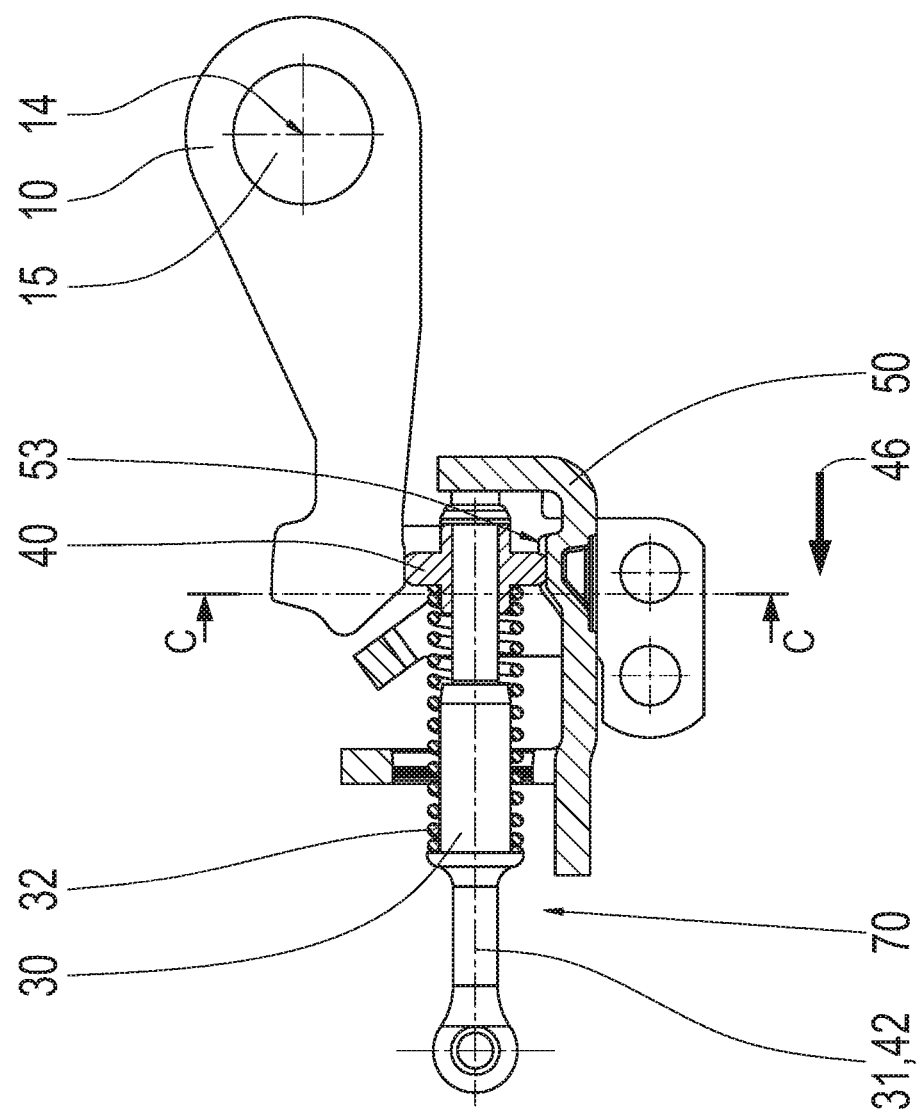
FIG. 4 shows a diagrammatic sectioning of an exemplary parking lock arrangement according to example aspects of the invention.
Figure 6:
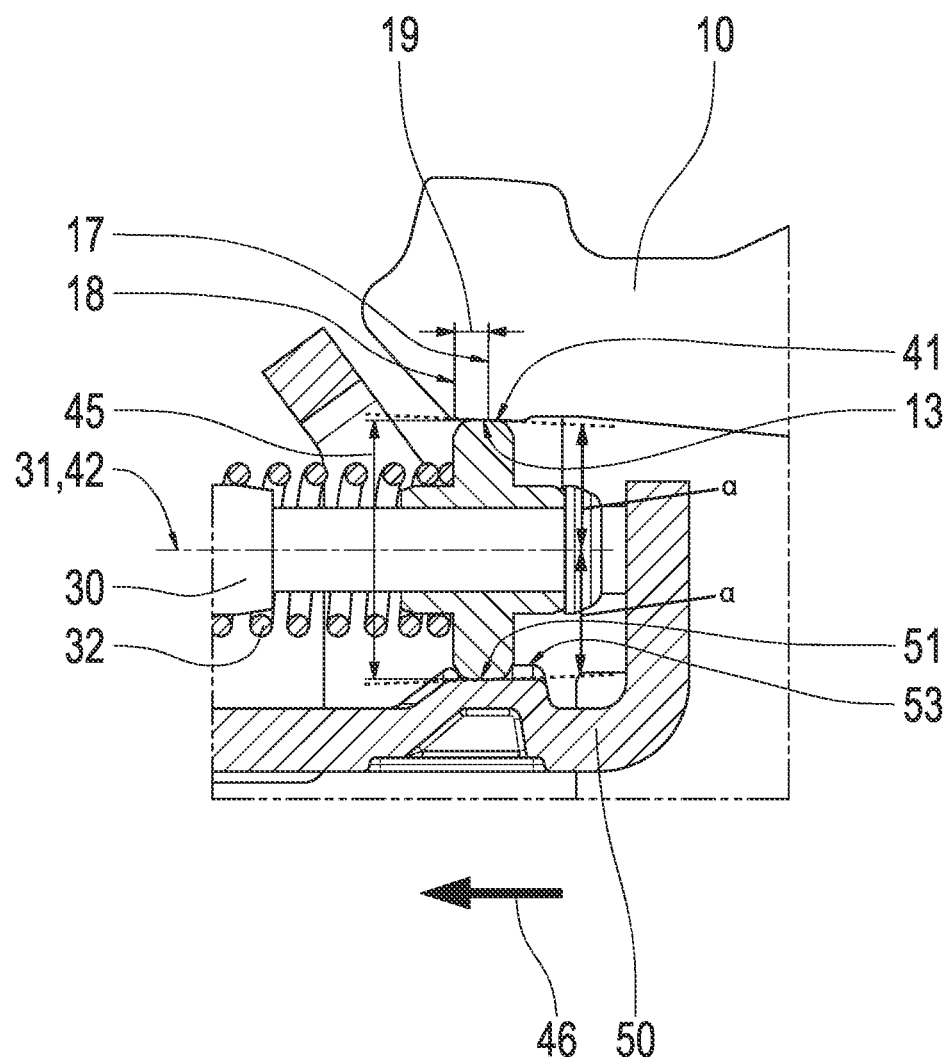
FIG. 6 shows a detailed section from FIG. 4, including a first exemplary embodiment of an actuating element according to example aspects of the invention.

With reference to FIGS. 4, 5, and 6, a parking lock arrangement including a first exemplary embodiment of an actuating element 40 according to example aspects of the invention is explained, derived from the parking lock arrangement according to FIG. 1. FIG. 4 shows a longitudinal section of the parking lock arrangement, whereas FIG. 5 shows a section transverse to the longitudinal section of FIG. 4. FIG. 6 shows, in an enlarged representation, a detail of FIG. 4, in order to describe, in greater detail, the actuating element 40 according to this first exemplary embodiment.

The actuating contour 41 of the actuating element 40, which is in contact with the actuating zone 13 of the parking pawl 10 as well as with the support contour 51 of the housing-affixed guide element 50 during the engagement and disengagement of the parking lock, is designed to be rotationally symmetrical with respect to the longitudinal axis 42 of the actuating element 40 and extends along this longitudinal axis 42. As viewed in the direction of the longitudinal axis 42 of the actuating element 40, the actuating contour 41 according to example aspects of the invention is designed as a circular arc, in contrast to the prior art.

In the present exemplary embodiment, as is apparent in FIG. 5, the actuating zone 13 of the parking pawl 10 is designed, by way of example, as a planar contact surface 16, which touches the outer diameter of the actuating contour 41 in the area of the longitudinal coordinate 17 of the actuating zone 13. The support contour 51 of the housing-affixed guide element 50, however, is designed, by way of example, as an osculation 53, in the manner of a circular arc surface, which extends, as view in the longitudinal direction, along the longitudinal axis 42 of the actuating element 40 at the surface of the guide element 50 facing the actuating element 40 and, in so doing, has a radius about the longitudinal axis 42 of the actuating element 40, which is approximate to the greatest outer diameter 45 of the actuating contour 41 of the actuating element 40. Such an osculation can be manufactured, in terms of fabrication, for example, by a pressing process and has advantages as compared to a planar surface with regard to the loadability of the parking lock arrangement during operation.

The surface 16 (as the actuating zone 13) of the parking pawl 10 as well as the osculation 53 (as the support contour 51) of the housing-affixed guide element 50 form, together with the actuating contour 41 of the actuating element 40, an opening angle (labeled α in FIG. 6) as viewed in the disengagement direction 46 of the actuating element 40, in the case of which the surface 16 and the osculation 53 are slanted relative to the longitudinal axis 42 of the actuating element 40 in such a way that the radial distance between the surface 16 and the longitudinal axis 42 as well as the radial distance between the osculation 53 and the longitudinal axis 42 are increased when the actuating element 40 is displaced in the disengagement direction 46 from the "parking pawl actuated" position of the actuating element 40 into the "parking pawl not actuated" position of the actuating element 40. This design advantageously brings about a reduction of the release forces, which must be applied in order to move the actuating element 40 in the disengagement direction 46. In the exemplary embodiment represented here, the slope of the surface 16 and the osculation 53, as viewed in the direction of the longitudinal axis 42 of the actuating element 40, are constant, by way of example, although, for example, they can also not be linear.

Due to component tolerances and play, a specimen-specific overlap of the particular contact surfaces results in the contact area between the actuating element 40 and the parking pawl 10 as well as in the contact area between the actuating element 40 and the guide element 50. In the represented exemplary embodiment, the first longitudinal coordinate, labeled with 17, of the actuating zone 13 of the parking pawl 10 is associated with an engagement condition of the actuating device, in which the actuating contour 41 and the actuating zone 13 are in contact with one another with the maximum possible axial overlap. Correspondingly, a second longitudinal coordinate 18 of the actuating zone 13 is also indicated in FIG. 6; it is associated with an engagement condition of the actuating device, in which the actuating contour 41 and the actuating zone 13 are in contact with one another with the minimally possible axial overlap, so that an axial overlap zone 19 results at the actuating zone 13 or the contact area 16 of the parking pawl 10.

The present technical teaching provides a person skilled in the art with certain freedoms in the geometric design of the actuating contour 4, which, according to example aspects of the invention, is designed as a circular arc extending, with rotational symmetry with respect to the longitudinal axis 42 of the actuating element 40, axially along this longitudinal axis 42. A person skilled in the art having knowledge of the present technical teaching also has certain freedoms with regard to the sizing of the circular arc radius and the maximum outer diameter of the actuating contour 41.

With respect to the second exemplary embodiment of an actuating element 40 designed according to example aspects of the invention, represented in FIG. 7, it is provided, as a structural detail, that the circular arc of the actuating contour 41 of the actuating element 40 is curved axially along the longitudinal axis 42 of the actuating element 40 about a radius 43, the center 44 of which is located outside the actuating element 40.

With respect to the third exemplary embodiment of an actuating element 40 designed according to example aspects of the invention, represented in FIG. 8, it is provided, as a structural detail, that the circular arc of the actuating contour 41 of the actuating element 40 is curved axially along the longitudinal axis 42 of the actuating element 40 about a radius 43, the center 44 of which is located on the longitudinal axis 42 of the actuating element 40. It can be provided that the actuating contour 41 is designed to be spherical, as viewed three-dimensionally.

With respect to the fourth exemplary embodiment of an actuating element 40 designed according to example aspects of the invention, represented in FIG. 9, it is provided, as a structural detail, that the circular arc of the actuating contour 41 of the actuating element 40 is curved axially along the longitudinal axis 42 of the actuating element 40 about a radius 43, the center 44 of which is located in an area between the longitudinal axis 42 of the actuating element 40 and the actuating contour 41.

Of course, the invention is not limited to the structural details of the exemplary embodiments described. Rather, a person skilled in the art will adapt the outer contour of the actuating element 40 provided for engaging and disengaging the parking lock—in particular the greatest outer diameter 45 of the actuating contour 41 and the radius 43 of the circular arc of the actuating contour 41—as well as the position of the actuating contour 41 relative to the actuating zone 13 of the parking pawl 10 and relative to the support contour 51 of the housing-affixed guide element 50 to the special requirements of the particular application. A person skilled in the art will also situationally adapt the geometry of the actuating zone 13 of the parking pawl 10 and the geometry of the support contour 51 of the housing-affixed guide element 50 to the particular application.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE NUMBERS 10 parking pawl
12 ratchet tooth of the parking pawl
13 actuating zone of the parking pawl
14 swivel axis of the parking pawl
15 pin
16 surface; planar contact surface
17 first longitudinal coordinate of the actuating zone
18 second longitudinal coordinate of the actuating zone
19 overlap zone
20 parking interlock gear
21 locking toothing of the parking interlock gear
22 tooth space of the locking toothing
30 actuating rod
31 longitudinal axis of the actuating rod
32 preloading spring
40 actuating element
41 actuating contour of the actuating element
42 longitudinal axis of the actuating element
43 radius of the actuating contour
44 center of the radius of the actuating contour
45 greatest outer diameter of the actuating contour
46 disengagement direction of the actuating element
50 housing-affixed guide element
51 support contour of the guide element
52 stop of the guide element
53 contact surface having osculation
60 holding spring
70 actuator
A detail
alpha angle
B-B cutting plane
C-C cutting plane

The invention claimed is:

1. A parking lock arrangement, comprising:
a parking pawl (10) swivelably mounted on a pin (15);
a parking interlock gear (20);
an actuating device for engaging and disengaging the parking pawl (10) for interlocking and releasing the parking interlock gear (20), the actuating device comprising an at least axially movable actuating rod (30) and an actuating element (40), the actuating element (40) axially displaceably mounted on an end (31) of the axially movable actuating rod (30) facing the parking pawl (10), the actuating element (40) comprising an actuating contour (41) contacting an actuating zone (13) of the parking pawl (10) and contacting a support contour (51) of a housing-affixed guide element (50) during engagement and disengagement of the parking lock, the actuating contour (41) rotationally symmetrical about an axis that is perpendicular to a longitudinal axis (42) of the actuating element (40), the actuating contour (41) extending along the longitudinal axis (42), the actuating contour (41) sliding on the actuating zone (13) of the parking pawl (10) and the support contour (51) of the housing-affixed guide element (50) during engagement and disengagement of the parking lock,
wherein the actuating contour (41) is a circular arc as viewed in a direction perpendicular to the longitudinal axis (42) of the actuating element (40).

2. The parking lock arrangement of claim 1, wherein the circular arc has a radius (43), a center (44) of the radius (43) located on the longitudinal axis (42) of the actuating element (40).

3. The parking lock arrangement of claim 2, wherein the actuating contour (41) is spherical.

4. The parking lock arrangement of claim 1, wherein the circular arc has a radius (43), a center (44) of the radius (43) positioned outside the actuating element (40).

5. The parking lock arrangement of claim 1, wherein the circular arc has a radius (43), a center (44) of the radius (43) located between the longitudinal axis (42) of the actuating element (40) and the actuating contour (41).

6. The parking lock arrangement of claim 1, wherein the actuating zone (13) of the parking pawl (10) is a line or a surface (16), the actuating zone (13) together with the actuating contour (41) of the actuating element (40) forming an opening angle as viewed in the direction perpendicular to the longitudinal axis (42), the opening angle defined between the disengagement direction (46) of the actuating element (40) and an extended line from both the actuating zone (13) of the parking pawl (10) and the actuating contour (41) of the actuating element (40).

7. The parking lock arrangement of claim 6, wherein the line or the surface (16) has a constant slope as viewed in the direction perpendicular to the longitudinal axis (42).

8. The parking lock arrangement of claim 6, wherein the line or the surface (16) has a non-linear slope as viewed in the direction perpendicular to the longitudinal axis (42).

9. The parking lock arrangement of claim 1, wherein:
the actuating zone (13) of the parking pawl (10) is an osculation, the osculation extending along the longitudinal axis (42) of the actuating element (40), the osculation having a radius about the longitudinal axis (42) of the actuating element (40), the radius of the osculation being approximately equal to a greatest outer diameter (45) of the actuating contour (41) of the actuating element (40); and
the osculation together with the actuating contour (41) of the actuating element (40) forming an opening angle as viewed in the direction perpendicular to the longitudinal axis (42), the opening angle defined between the disengagement direction (46) of the actuating element (40) and an extended line from both the osculation and the actuating contour (41) of the actuating element (40).

10. The parking lock arrangement of claim 9, wherein the osculation has a constant slope as viewed in the direction perpendicular to the longitudinal axis (42).

11. The parking lock arrangement of claim 9, wherein the osculation has a non-linear slope as viewed in the direction perpendicular to the longitudinal axis (42).

12. The parking lock arrangement of claim 1, wherein the support contour (51) of the housing-affixed guide element (50) is a line or a surface, the support contour (51) together with the actuating contour (41) of the actuating element (40) forming an opening angle as viewed in the direction perpendicular to the longitudinal axis (42), the opening angle defined between the disengagement direction (46) of the actuating element (40) and an extended line from both the support contour (51) and the actuating contour (41) of the actuating element (40).

13. The parking lock arrangement of claim 12, wherein the line or the surface has a constant slope as viewed in the direction perpendicular to the longitudinal axis (42).

14. The parking lock arrangement of claim 12, wherein the line or the surface has a non-linear slope as viewed in the direction perpendicular to the longitudinal axis (42).

15. The parking lock arrangement of claim 1, wherein:
the support contour (51) of the housing-affixed guide element (50) is an osculation (53), the osculation (53) extending along the longitudinal axis (42) of the actuating element (40), the osculation (53) having a radius about the longitudinal axis (42) of the actuating element (40), the radius of the osculation (53) being approximately equal to a greatest outer diameter (45) of the actuating contour (41) of the actuating element (40); and the osculation (53) together with the actuating contour (41) of the actuating element (40) forms an opening angle as viewed in the direction perpendicular to the longitudinal axis (42), the opening angle defined between the disengagement direction (46) of the actuating element (40) and an extended line from both the osculation (53) and the actuating contour (41) of the actuating element (40).

16. The parking lock arrangement of claim 15, wherein the osculation has a constant slope as viewed in the direction perpendicular to the longitudinal axis (42).

17. The parking lock arrangement of claim 15, wherein the osculation has a non-linear slope as viewed in the direction perpendicular to the longitudinal axis (42).

18. The parking lock arrangement of claim 1, wherein the actuating contour (41) has a circular shape in a plane that is perpendicular to the longitudinal axis (42) of the actuating element (40).

* * * * *